United States Patent
Kuo et al.

(10) Patent No.: US 7,337,371 B2
(45) Date of Patent: Feb. 26, 2008

(54) METHOD AND APPARATUS TO HANDLE PARITY ERRORS IN FLOW CONTROL CHANNELS

(75) Inventors: Chen-Chi Kuo, Pleasanton, CA (US); Sridhar Lakshmanamurthy, Sunnyvale, CA (US); Jeen-Yuan Miin, Palo Alto, CA (US); Raymond Ng, Fremont, CA (US)

(73) Assignee: Intel Corporation, Santa Clara, CA (US)

( * ) Notice: Subject to any disclaimer, the term of this patent is extended or adjusted under 35 U.S.C. 154(b) by 1016 days.

(21) Appl. No.: 10/750,999

(22) Filed: Dec. 30, 2003

(65) Prior Publication Data

US 2005/0141535 A1   Jun. 30, 2005

(51) Int. Cl.
*G06F 11/00* (2006.01)
(52) U.S. Cl. .......................................... 714/52; 714/54
(58) Field of Classification Search ................ 714/52, 714/54
See application file for complete search history.

(56) References Cited

U.S. PATENT DOCUMENTS

| | | | | |
|---|---|---|---|---|
| 4,791,642 A | * | 12/1988 | Taylor et al. ................ | 714/764 |
| 4,914,653 A | * | 4/1990 | Bishop et al. .............. | 370/462 |
| 5,233,616 A | * | 8/1993 | Callander .................... | 714/758 |
| 6,457,119 B1 | * | 9/2002 | Boggs et al. ............... | 712/227 |
| 6,519,736 B1 | * | 2/2003 | Chen et al. ................. | 714/768 |
| 6,543,028 B1 | * | 4/2003 | Jamil et al. ................. | 714/800 |
| 6,571,317 B2 | * | 5/2003 | Supnet ....................... | 711/133 |
| 6,826,148 B1 | * | 11/2004 | Lee ............................ | 370/230 |
| 7,127,643 B2 | * | 10/2006 | Tremblay et al. ............ | 714/52 |
| 7,171,591 B2 | * | 1/2007 | Chen .......................... | 714/52 |
| 7,251,704 B2 | * | 7/2007 | Solomon et al. ........... | 710/316 |
| 7,302,619 B1 | * | 11/2007 | Tompkins et al. ........... | 714/54 |
| 2003/0093726 A1 | * | 5/2003 | Tremblay et al. ............ | 714/52 |
| 2005/0055610 A1 | * | 3/2005 | Sassa et al. .................. | 714/54 |
| 2006/0230235 A1 | * | 10/2006 | O'Connor et al. .......... | 711/133 |

OTHER PUBLICATIONS

"Intel IXP2400 Network Processor for OC-48/2.5 Gbps network access and edge applications", Product Brief, (2003), 6 pages.
"Intel IXP2800 Network Processor For OC-192/10 Gbps network edge and core applications", Product Brief, (2002), pp. 1-6.

* cited by examiner

*Primary Examiner*—Bryce P Bonzo

(57) ABSTRACT

Methods, software and systems for handling parity errors in flow control channels are presented. A network processor is provided having a flow control message First In First Out (FIFO) buffer and wherein the FIFO buffer includes a parity field. The network processor is included as either or both of an Ingress network processor and an Egress network processor and is used within a CSIX system or an NPSI NPE system.

27 Claims, 7 Drawing Sheets

METHOD AND APPARATUS TO HANDLE PARITY ERRORS IN FLOW CONTROL CHANNELS

CROSS REFERENCE TO RELATED APPLICATIONS

Not applicable.

STATEMENT REGARDING FEDERALLY SPONSORED RESEARCH

Not applicable.

FIELD OF THE INVENTION

The present disclosure relates generally to network processor parity errors and, more particularly, to parity errors in flow control messages.

BACKGROUND OF THE INVENTION

The Internet, as well as other networks, has become more complicated with additional bandwidth requirements, a larger number of users, and increasingly elaborate applications. In order to handle these increased demands, new protocols and network data types have been developed. Network Processors (NPs), which are well known to those of ordinary skill in the art, are used to perform various tasks such as processing network packets, network data streams, and network objects to accomplish specific tasks.

The functions that the NP performs can be categorized into physical-layer functions, switching and fabric-control functions, packet-processing functions, and system-control functions. In some instances the packet-processing functions can be further subdivided into network-layer packet processing and higher-layer packet processing.

The physical-layer functions handle the actual signaling over the network media connections, such as an Ethernet port, an optical fiber connection, or a coaxial T3 connection. The NP is used to convert the data packets into signals which are transmitted over the physical media. The NPs often work according to a media access control and physical layer protocols such as Ethernet, Synchronous Optical Network (SONET), Time Division Multiple Access (TDMA), Code Division Multiple Access (CDMA), and the like.

The switching and fabric-control functions are performed by the NP direct traffic inside the NP. The functions are used to direct the data from the ingress port of the NP to an appropriate egress port of the NP and toward the correct network. The functions further include performing operations such as queuing the data in appropriate order or priority at these ports.

The packet-processing functions performed by the NP handle the processing of all network protocols. Thus, a packet containing instructions on allocating a stream for continuous guaranteed delivery is handled at this level.

System-control or host-processing functions performed by the NP include management of other components of the hardware unit, such as power management, peripheral device control, console port management, and the like.

NP processing typically includes other functions as well. A typical router application involves receiving packets, performing route table look-ups, performing packet classification, performing packet metering, performing congestion avoidance, performing packet transmit scheduling and finally performing packet transmittal. NPs need to provide sufficient processing power in order to run network applications efficiently and cost-effectively.

A network processor typically includes built-in devices such as 10/100, Gigabit Ethernet, and ATM interfaces. The NP can further include one or more Micro Engines (MEs), associated I/O interfaces and memory, a processor core and memory. In one of the operating modes of the NP, the ME is programmed to act as Gigabit Ethernet engine with Transmission Control Protocol (TCP) offload functions.

Flow control messages are used to control the transmission of data from an Ingress NP to a switch fabric as part of a network processing system. The flow control messages are typically passed from the switch fabric to an Egress NP and then from the Egress NP to the Ingress NP. Parity errors can occur at any place along the path from the switch fabric, through the Egress NP to the Ingress NP.

BRIEF DESCRIPTION OF THE DRAWINGS

The foregoing features of the method and apparatus to handle parity errors in flow control channels may be more fully understood from the following description of the drawings in which.

DETAILED DESCRIPTION OF THE INVENTION

Figure 1:
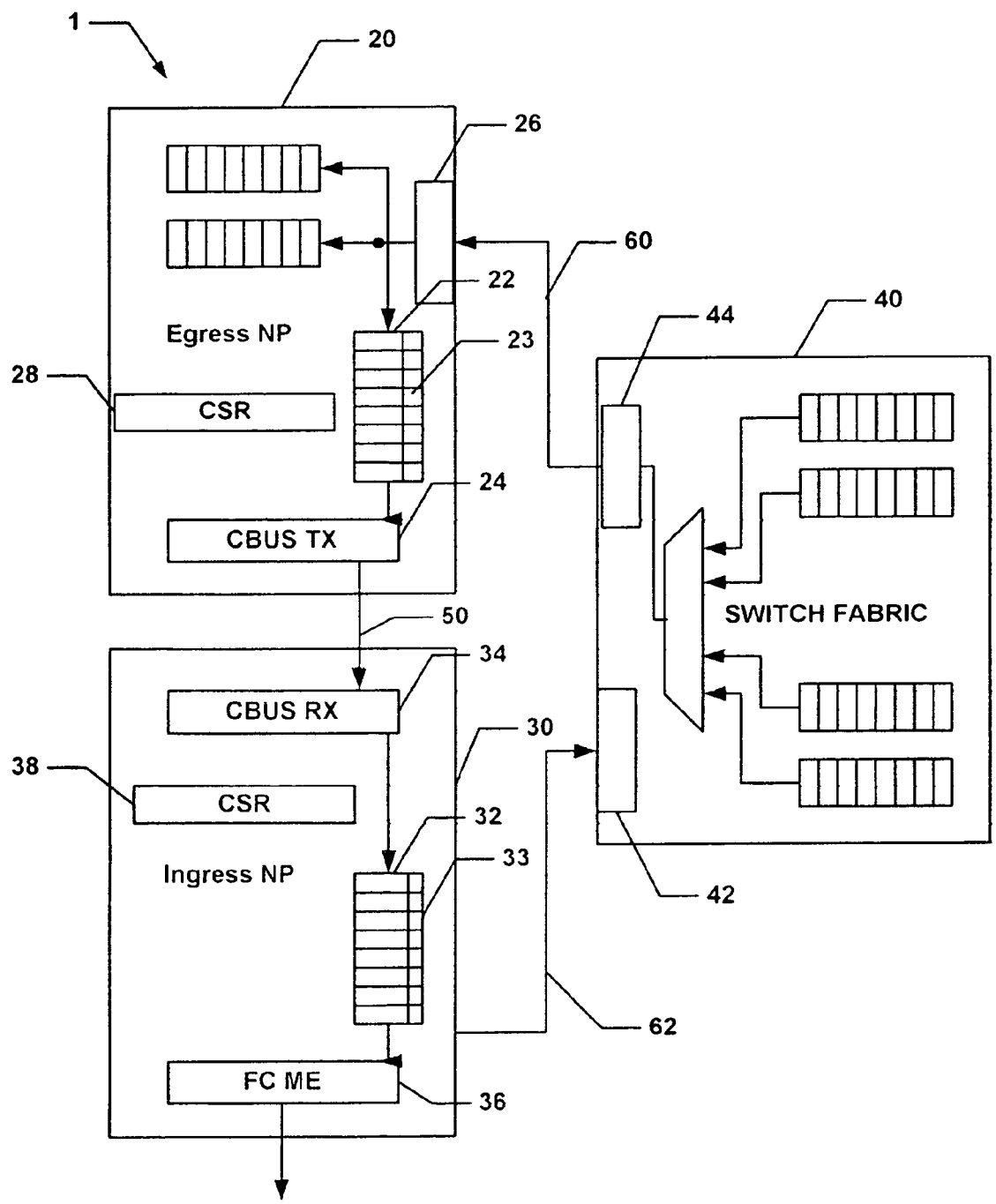
FIG. 1 comprises a block diagram of a configuration to handle flow control parity errors in a CSIX system.

Referring now to FIG. 1, a Full Duplex Common Switch Interface (CSIX) configuration 1 is shown. The configuration 1 includes an Egress NP 20, an Ingress NP 30 and a Switch Fabric 40. The Egress NP 20 handles the traffic received from the Switch Fabric 40 by way of a 32-bit CSIX bus 60. The Ingress NP 30 handles the traffic sent to the Switch Fabric 40 by way of a 32-bit CSIX bus 62. The Egress NP 20 communicates with the Ingress NP 30 by way of a CBus 50.

Communication along the CSIX bus 60 is performed through data arranged in frames, known as CFrames. A CFrame comprises a base header, an optional extension header, an optional payload and a 16-bit vertical parity field as depicted below:

| CFrame Component: | Base header | Extension header | Payload | Vertical parity |
|---|---|---|---|---|
| Length: | 2 bytes | 0-4 bytes | 1-256 bytes | 2 bytes |

A CFrame begins with a base header which is two bytes long and contains the payload length, the frame type (idle, unicast, multicast, broadcast or flow control) and ready bits for flow control. The base header frame type determines the extension header format. An extension header (if required) follows the base header. The extension header contains additional information used to handle the frame, for example, the destination fabric egress CSIX interface for unicast frames.

A two-byte vertical parity field follows the payload. The parity bytes are the highest numbered bytes of the last word. Padding bytes are added in order to make the overall CFrame length a multiple of the Cword size. Any padding added to the CFrame is included as part of the vertical parity calculation.

When the Egress NP 20 is receiving data, Idle CFrames are recognized and discarded. Flow-control CFrames are handled by the Egress NP 20 and transmitted to the Ingress NP 30 using the Cbus 50. For transmission from the Ingress NP 30, CFrames are written into a transmit buffer. Vertical and horizontal parity generation is performed by the Ingress NP. The Ingress NP 30 automatically handles the transmission of idle CFrames with RDY bits updates when there are no data or flow-control CFrames to transmit.

Horizontal parity is an odd parity across 32 bits of data. The horizontal parity bit is carried across the CSIX interface by the busses. Each bit of parity covers a 32-bit data word.

Vertical parity provides an additional set of parity bits that improve the probability of error detection. In order to calculate vertical parity bits, the CFrame is treated as a series of 16-bit words organized as a two dimensional block as shown below. A vertical parity bit is generated for each of the 16 bit positions (columns) in the block across all the rows. The resulting 16 bit error detecting code (Vpar) is appended to the payload.

| 16 bit words | Byte 0 Bit 7 | Byte 0 Bit 6 | ... | Byte 1 Bit 0 |
|---|---|---|---|---|
| Word 0 | b(15,0) | b(14,0) | ... | b(0,0) |
| Word 1 | b(15,1) | b(14,1) | ... | b(0,1) |
| . | . | . | . | . |
| . | . | . | . | . |
| . | . | . | . | . |
| Word m | b(15,m) | b(14,m) | ... | b(0,m) |
| Vpar | Vpar15 | Vpar14 | ... | Vpar0 | where

Vpar[i]=ith bit of Vertical Parity word, b(I,m)=ith bit of data word m; and m=number of 16-bit word in the CFrame.

When no data is being transmitted, the ready field is kept active by regular transmission of Idle CFrames. Idle CFrames are neither control type CFrames nor data type CFrames, and can be sent at any time. When an error is detected (such as a parity error) on the CFrame, ready bits from the CFrame are ignored and interpreted as "not ready". In the Switch Fabric 40, the CSIX Ingress interface 42 detecting the error sends a message causing the corresponding CSIX Egress interface 44 to suspend transmission of CFrames until the Ingress interface 42 receives a CFrame without an error.

Flow control information from the Switch Fabric 40 is sent to the Egress NP 20 and is communicated to the Ingress NP 30 to control transmission from the Ingress NP 30 to the Switch Fabric 40. Before CSIX flow control CFrames received from the Switch Fabric 40 on the Egress NP 20 are put into FCEFIFO 22, the interface circuit 26 in Egress NP inspects the parity fields of these CFrames. Corrupted CFrames are discarded in the interface. Otherwise, the entire CFrame is put in the FCEFIFO 22. The FCEFIFO 22 is 32-bit-wide buffer for the flow control information. The FCEFIFO 22 holds data while it is being transmitted off of the Egress NP 20.

The present method and apparatus used to handle errors in CSIX flow control channels protects each entry in the FCEFIFO 22 with an additional 1-bit parity field 23. If a parity error occurs while data is read from the FCEFIFO 22 on the Egress NP 20 (for example, due to an alpha particle changing a bit from a "0" to a "1"), a bit in the interface unit control CSR 28 of the Egress NP 20 is marked and the core processor, which is also located in NP, may be interrupted. While flow control CFrames are typically forwarded from the Egress NP 20 to the Ingress NP 30 in a "cut-through" manner, the Egress NP 20 corrupts the Horizontal Parity of the transfers for the corrupted data and corrupts the Vertical Parity of the CFrame. The Ingress NP can detect the corrupted Horizontal Parity and Vertical Parity of this Cframe, which results from the parity error in the FCEFIFO.

While receiving CFrames via the CBUS 50 from the Egress NP 20, the interface circuit in the Ingress NP checks both Horizontal Parity and Vertical Parity. If a parity error is detected in any part of a CFrame, the Ingress NP will drop the received portion of this CFrame and continue discarding the subsequent data for the remained part of the CFrame until the first transfer of a new CFrame is being received. In addition, a bit in the Ingress NP interface control CSR 38 is set and the core processor (not shown) can be interrupted. This error can occur while flow control frames are being read from FCEFIFO 22 of the Egress NP or during transmittal on the communication path between the Egress NP and the Ingress NP.

The Ingress NP 30 puts the CFrames with correct parity fields into the FCIFIFO 32. The present method and apparatus used to handle errors in CSIX flow control channels also protects each entry in the FCIFIFO 32 with an additional 1-bit parity field 33. The FCIFIFO is used to store the flow control information. The FCIFIFO 32 holds data received into the Ingress NP until the MEs can read it. The NP does not make a CFrame visible in the FCIFIFO until the entire CFrame has been received without errors.

If a parity error occurs while data is read from FCIFIFO 32 of the Ingress NP 30 before being returned to ME transfer register(s) 36, an error bit in the interface control CSR 38 of Ingress NP is set and the core processor (not shown) may be interrupted. The corrupted data is pushed back to the ME with an error signal asserted. Because the payload length field is used to decide the number of FCIFIFO reads to subsequent data in the flow control Cframe, it can be potentially corrupted when a FCIFIFO parity error is detected. As a result, the base header of the following CFrame may not be distinguishable in the FCIFIFO 32 and all data in the FCIFIFO should be flushed. Software writes into a FCIFIFO_FLUSH CSR to reset the FCIFIFO. While receiving a FLUSH command, the Ingress NP interface circuit will discard any partial frame in transit (the starting portion of the frame is flushed) from the CBUS to the FCIFIFO in addition to flushing the data in the FCIFIFO. Software running on the ME can also choose to continue reading from FCIFIFO until it is drained.

Flow diagrams of the presently disclosed methods are depicted in FIGS. 2, 3, 6 and 7. The rectangular elements are herein denoted "processing blocks" and represent computer software instructions or groups of instructions. The diamond shaped elements, are herein denoted "decision blocks," represent computer software instructions, or groups of instructions which affect the execution of the computer software instructions represented by the processing blocks.

Alternatively, the processing and decision blocks represent processing performed by functionally equivalent circuits such as a digital signal processor circuit or an application specific integrated circuit (ASIC). The flow diagrams do not depict the syntax of any particular programming language. Rather, the flow diagrams illustrate the functional information one of ordinary skill in the art requires to fabricate circuits or to generate computer software to perform the processing required in accordance with the method and apparatus used to handle parity errors in flow control channels. It should be noted that many routine program elements, such as initialization of loops and variables and the use of temporary variables are not shown. It will be appreciated by those of ordinary skill in the art that unless otherwise indicated herein, the particular processing sequence described is illustrative only and can be varied without departing from the present application. Thus, unless otherwise stated the processing described below is unordered meaning that, when possible, the processing can be performed in any convenient or desirable order.

Figure 2:
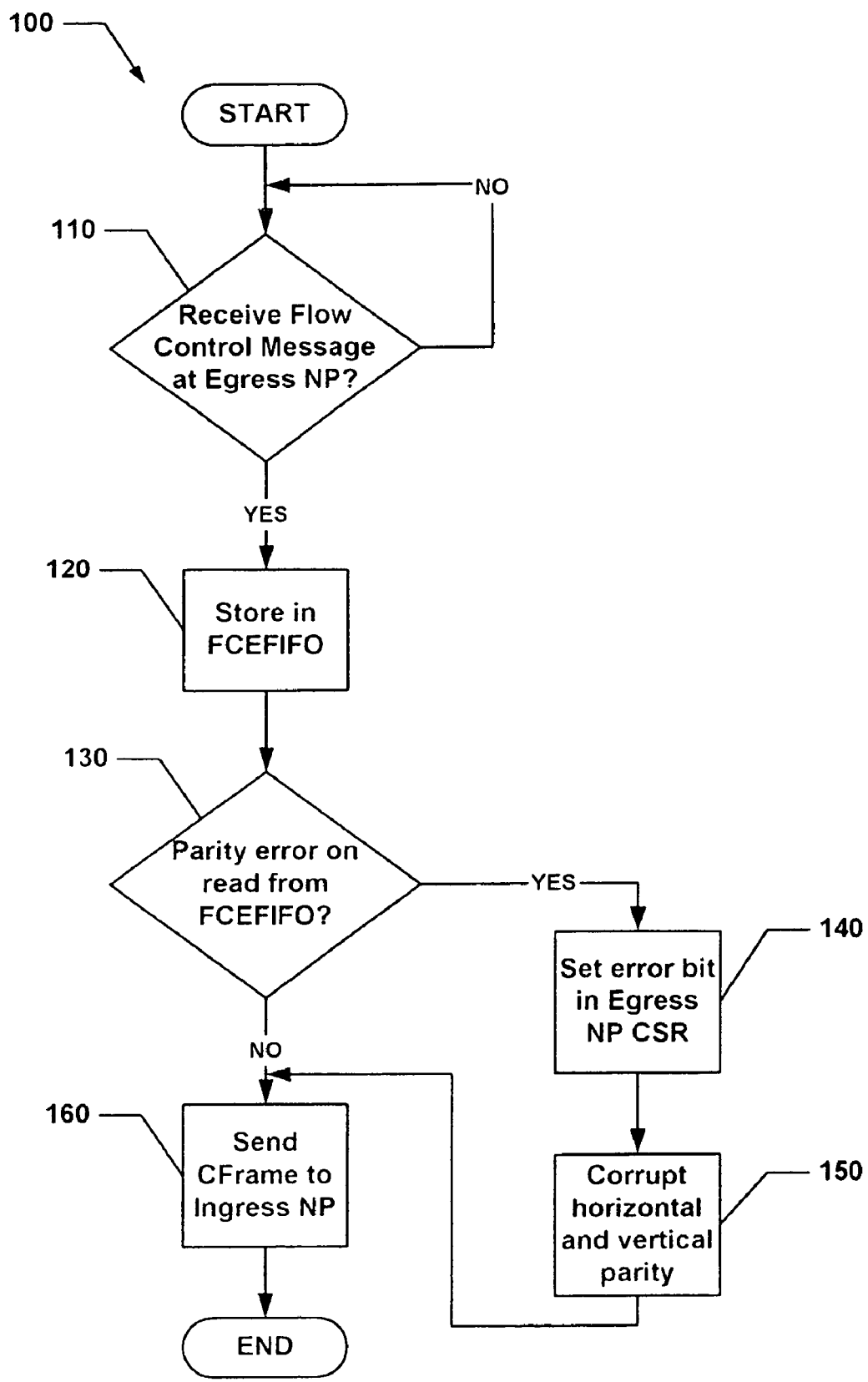
FIG. 2 comprises a flow diagram of a method of handling parity errors in flow control messages in an Egress network processor of a CSIX system.

Referring now to FIG. 2, a flow diagram for the process 100 of handling control flow message parity errors in an Egress NP is shown. Processing starts and decision block 110 is executed. In decision block 110, a determination is made regarding whether a flow control message was received by the Egress NP. When a flow control message has not been received, processing loops back until a flow control message has been received. When a flow control message has been received, processing continues with processing block 120.

In processing block 120 the flow control message is stored in the FCEFIFO. At this point, a single parity bit is determined for the message and is stored with the message in the FIFO. The FIFO can store several messages, and the messages are read from the FIFO at the appropriate time.

Processing continues with decision block 130 where a determination is made regarding whether there was a parity error when the message was read from the FIFO. When a parity error occurs on a read from the FCEFIFO processing continues with processing block 140. When a read from the FCEFIFO does not result in a parity error, processing continues with processing block 160.

As a result of the parity error on the read from the FCEFIFO, as shown in processing block 140 the error bit in the Egress NP CSR is set. This provides notification to the core processor that an error has been detected. Additionally, processing block 150 is executed in which as a result of the parity error, the horizontal parity of the transfer is corrupted and the vertical parity of the CFrame is also corrupted. The Ingress NP detects the occurrence of the corrupted horizontal parity and the corrupted vertical parity, and takes appropriate action.

After executing processing block 150 when a parity error occurs or as a result of the read from the FCEFIFO not resulting in a parity error processing block 160 is executed. In processing block 160 the CFrame is sent to the Ingress NP. Processing then stops.

Figure 3:
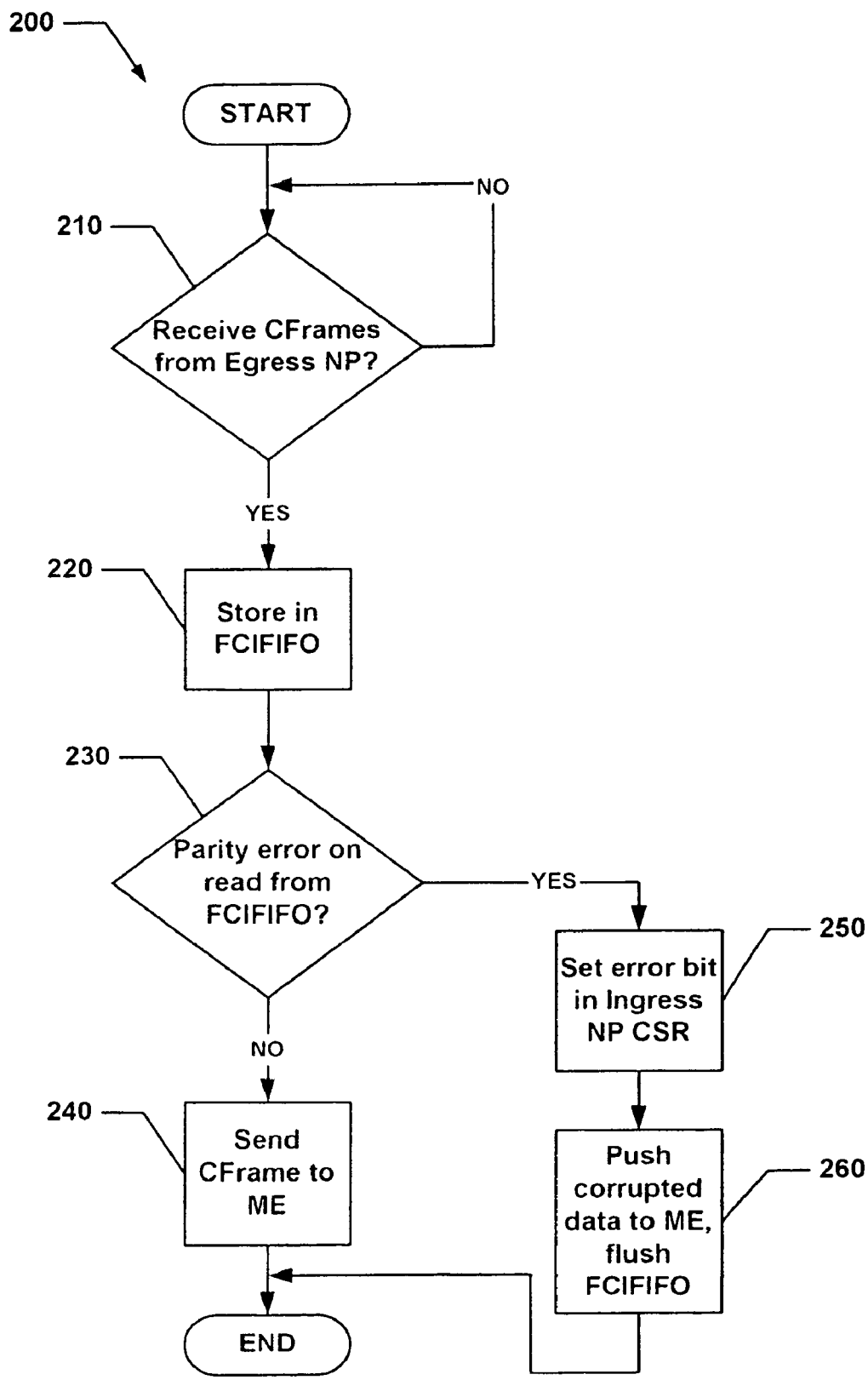
FIG. 3 comprises a flow diagram of a method of handling parity errors in flow control messages in an Ingress network processor of a CSIX system.

Referring now to FIG. 3, a flow diagram for the process 200 of handling control flow message parity errors in an Ingress NP is shown. Processing starts and decision block 210 is executed. In decision block 210 a determination is made regarding whether a flow control message was received from the Egress NP. When a flow control message has not been received, processing loops back until a flow control message has been received. When a flow control message has been received, processing continues with processing block 220.

In processing block 220 the flow control message is stored in the FCIFIFO. At this point, a single parity bit is determined for the message and is stored with the message in the FIFO. The FIFO can store several messages, and the messages are read from the FIFO at the appropriate time.

Processing continues with decision block 230 where a determination is made regarding whether there was a parity error when the message was read from the FIFO. When a parity error occurs on a read from the FCEFIFO processing continues with processing block 250. When a read from the FCIFIFO does not result in a parity error, processing continues with processing block 240.

In processing block 250, as a result of the parity error on the read from the FCIFIFO, the error bit in the Ingress NP CSR is set. This provides notification to the core processor that an error has been detected. Additionally, processing block 260 is executed where the corrupted data is pushed to the ME and an error signal is asserted. Also the FCIFIFO is flushed.

After executing processing block 260 when a parity error occurs or as a result of the read from the FCIFIFO not resulting in a parity error processing block 240 is executed. In processing block 240 the CFrame is sent to the ME. Processing then stops.

In another embodiment a combination of hardware and software is provided to handle parity errors that occur on Network Processor Streaming Interface (NPSI) Network Processing Engine (NPE)-Fabric flow control messages during buffer reads and off-chip transmit.

Figure 4:
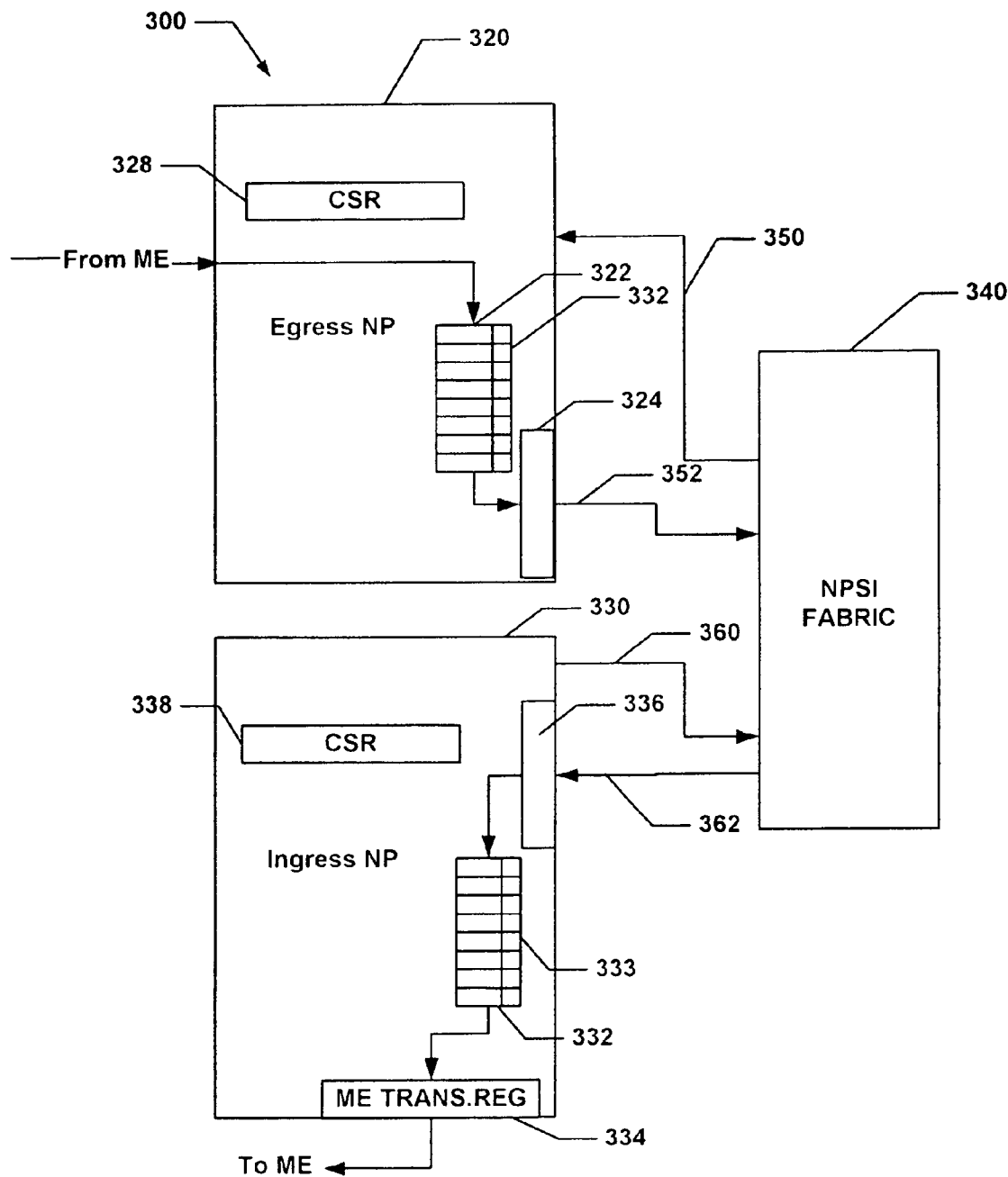
FIG. 4 comprises a block diagram of a configuration used to handle flow control parity errors in an NPSI-NPE system.

Referring now to FIG. 4, a router line card 300 built on two network processors and an NPSI Fabric is shown. NPSI-directed status flow control messages provide backpressure mechanisms that enable or disable transmission on a single flow, a logical grouping of flows or a subset of flows.

When the Egress NP decides not to take any more data of a particular flow from the switch fabric 340, flow control is triggered. Software running on the MEs composes a flow control message and enqueues the message in FCEFIFO 322 if the FIFO is not full. The interface circuit 324 will retrieve messages from the FIFO 322 and send them to the NPSI fabric 340.

If a parity error occurs while data is read from ME transfer register(s) before being written to FCEFIFO 322 in Egress NP 320, an error signal is asserted by the ME and delivered to NPSI Switch Fabric 340. This FCEFIFO entry will be marked as corrupted. While transmitting this message to NPSI fabric interface, Diagonal Interleaved Parity (DIP2) code will be corrupted. The receive devices can identify the error with corrupted DIP2 code.

Figure 5:
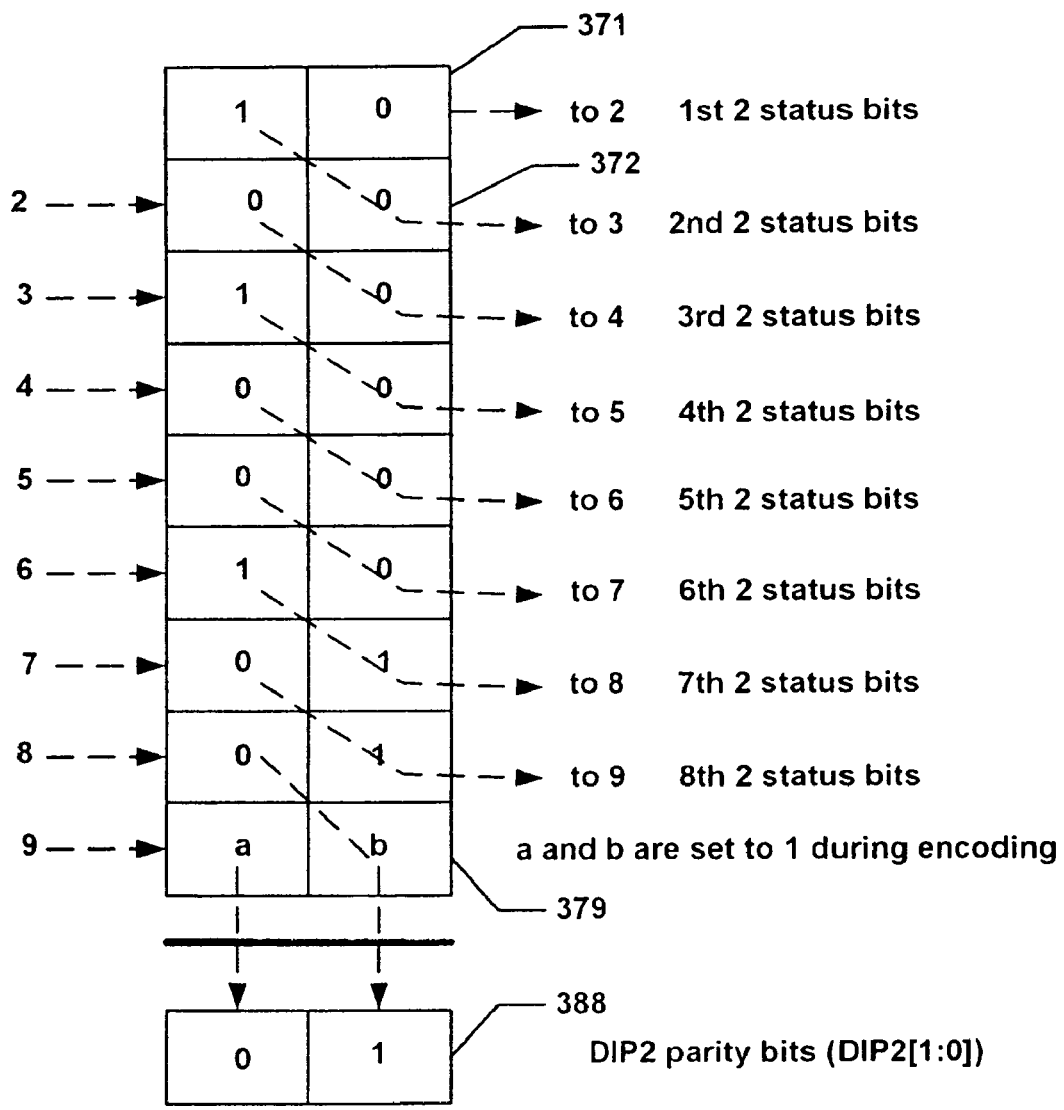
FIG. 5 is a diagram showing how DIP-2 code is generated.

DIP-2 code is determined by calculating parity diagonally across the bits which are arranged in a block. As shown in FIG. 5, a stream of 2-bit status words are arranged with the first 2-bit bit word 371 comprising the top row, the second 2-bit word 372 comprising the second row etc. for eight 2-bit words. The bottom row comprises the DIP2 parity bits 379, which are both set to a 1 during encoding. The result is a 2-bit by 9-bit matrix of data. The DIP2 parity bits are generated by summing diagonally across the matrix. This results in a 2-bit DIP-2 code 388.

The present method and apparatus used to handle errors in NPSI NPE flow control channels protects each entry in the FCEFIFO 322 with an additional 1-bit parity field 323. If a parity error occurs while data is read from FCEFIFO before being transmitted, an error bit in the control CSR of Egress NP 320 is marked and the core processor (not shown), which is also located in the NP, can be interrupted. While transmitting this message to NPSI NPE-fabric interface, DIP2 code will be corrupted. The receive devices can identify the error with corrupted DIP2 code.

When the NPE fabric 340 decides not to take any more data of a particular flow from the Ingress NP 330, flow control is triggered. Flow control messages are sent from the NPE fabric 340 to the Ingress NP 330. After being decoded by the MSF, flow control messages are staged in NPSI_FCIFIFO. While NPSI_FCIFIFO is not empty, software running on MEs retrieves and processes flow control messages from NPSI_FCIFIFO, and stop transmission on a flow, queue, or class.

While receiving flow control messages, the interface circuit 336 in the Ingress NP checks the DIP2 code of the messages. The NP 330 will discard the entire message if bad parity is detected. In addition, an error bit in the control CSR of Ingress NP is marked and the core processor can be interrupted. On the other hand, a valid message will enter FCIFIFO 332.

The present method and apparatus used to handle errors in NPSI-NPE flow control channels protects entries in the FCEFIFO 332 with an additional 1-bit parity field 333. If an error occurs while data is read from the FCIFIFO 332 of Ingress NP 330 before being returned to ME transfer register(s) 334, an error bit in the control CSR of Ingress NP is marked and the core processor can be interrupted. The corrupted data is pushed back to the ME with an error signal asserted. While software running on ME is informed of the corrupted flow control message, it can simply discard the message.

The described method and apparatus uses a combination of hardware and software to handle errors that can only be detected with the augmented parity protection in the FCIFIFO and FCEFIFO buffers, which is an enhancement over current network processors.

Figure 6:
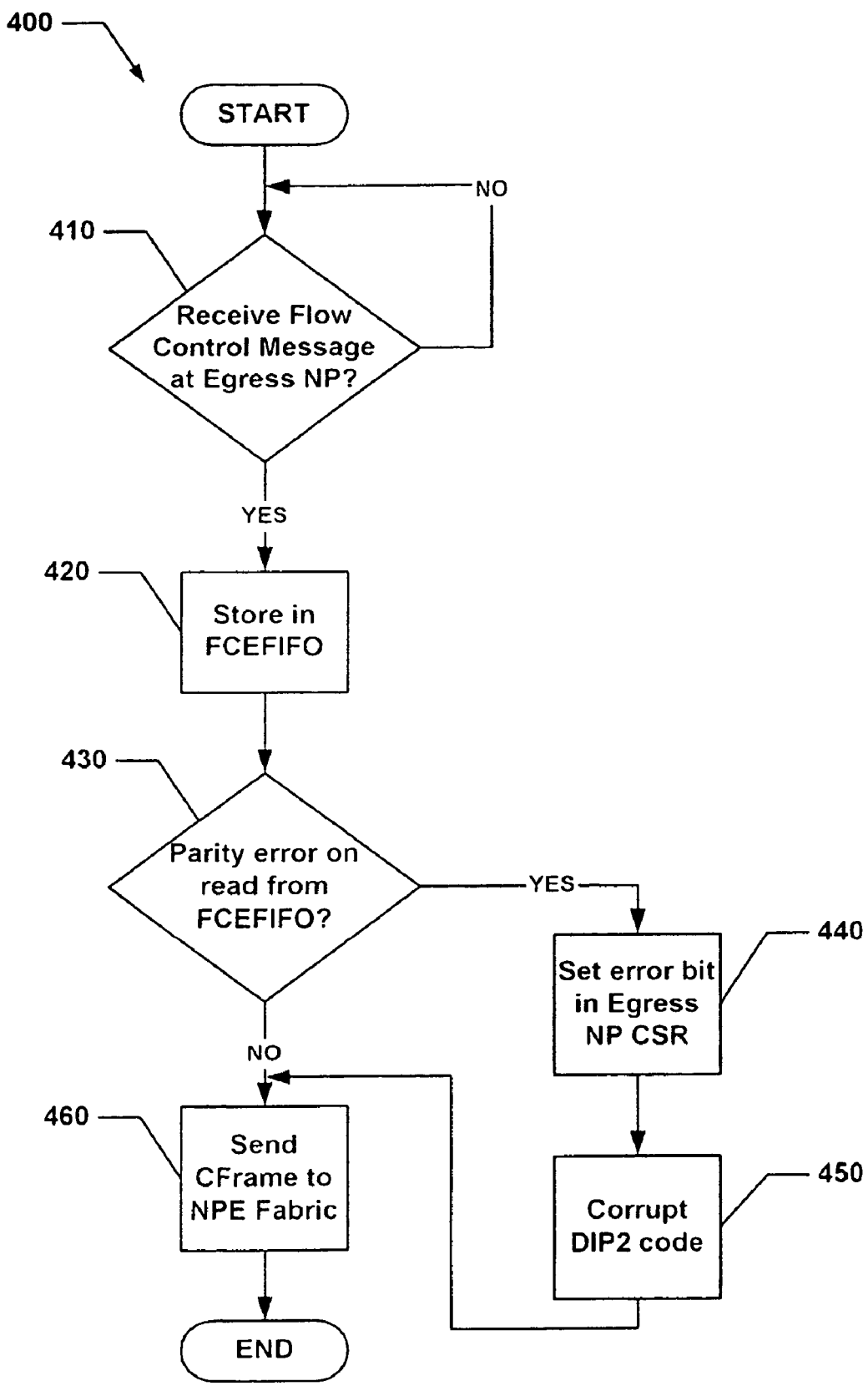
FIG. 6 comprises a flow diagram of a method of handling parity errors in flow control messages in an Egress network processor in an NPSI-NPE system.

Referring now to FIG. 6, a flow diagram for the process 400 of handling control flow message parity errors in an Egress NP is shown. Processing starts and decision block 410 is executed. In decision block 410 a determination is made regarding whether a flow control message was received by the Egress NP. When a flow control message has not been received, processing loops back until a flow control message has been received. When a flow control message has been received, processing continues with processing block 420.

In processing block 420 the flow control message is stored in the FCEFIFO. At this point, a parity bit is determined for the message and is stored with the message in the FIFO. The FIFO can store several messages, and the messages are read from the FIFO at the appropriate time.

Processing continues with decision block 430 where a determination is made regarding whether there was a parity error when the message was read from the FIFO. When a parity errors occurs on a read from the FCEFIFO processing continues with processing block 440. When a read from the FCEFIFO does not result in a parity error, processing continues with processing block 460.

As shown in processing block 440, as a result of the parity error on the read from the FCEFIFO, the error bit in the Egress NP CSR is set. This provides notification to the core processor that an error has been detected. Additionally, processing block 450 is executed.

In processing block 450, as a result of the parity error, the DIP2 code is corrupted. The receive devices can identify the error with the corrupted DIP2 code.

After executing processing block 450 when a parity error occurs, or as a result of the read from the FCEFIFO not resulting in a parity error, processing block 460 is executed. In processing block 160 the CFrame is sent to the NPE fabric. Processing then stops.

Figure 7:
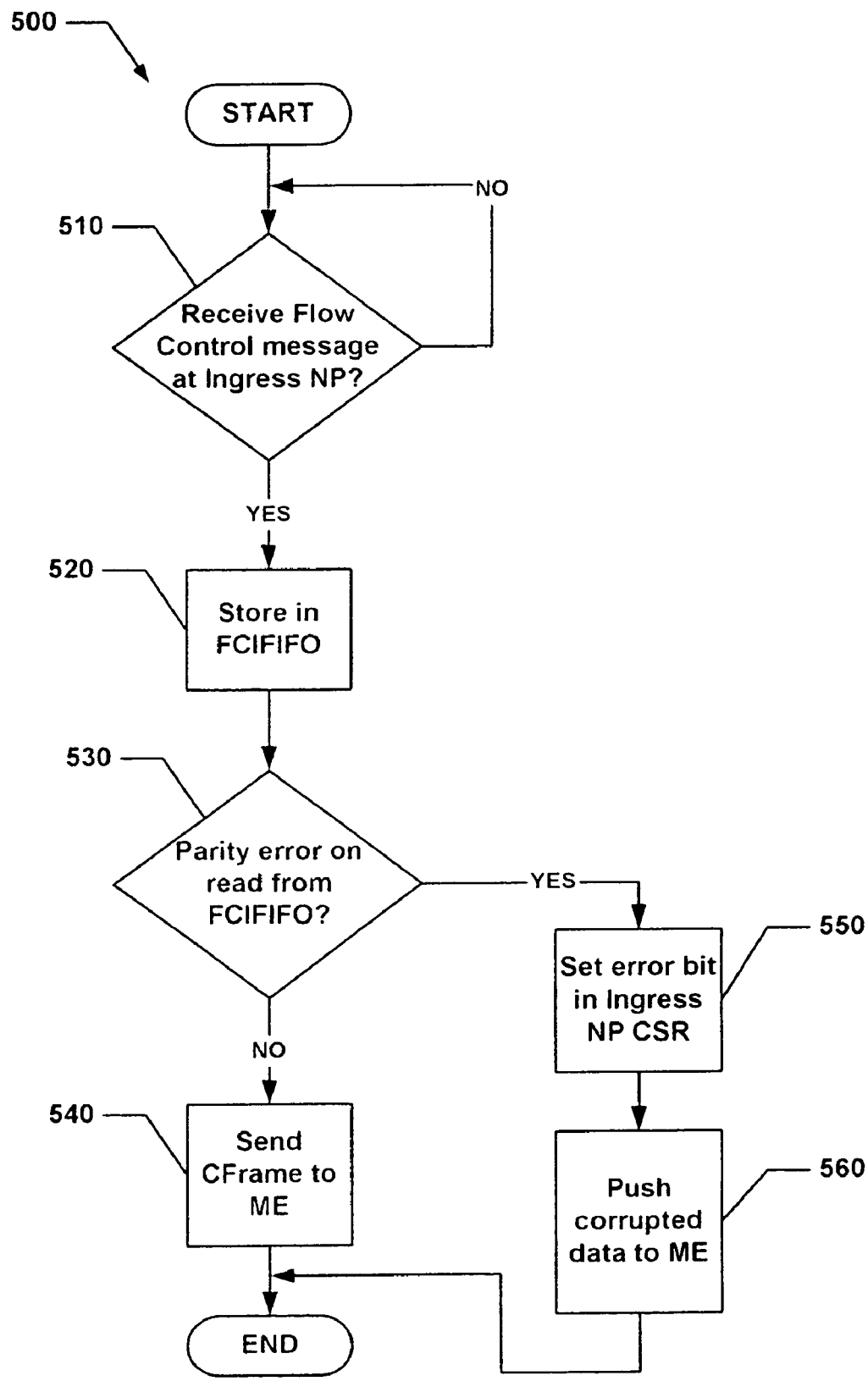
FIG. 7 comprises a flow diagram of a method of handling parity errors in flow control messages in an Ingress network processor in an NPSI-NPE system.

Referring now to FIG. 7, a flow diagram for the process 500 of handling control flow message parity errors in an Ingress NP is shown. Processing starts and decision block 510 is executed. In decision block 510 a determination is made regarding whether a flow control message was received from the Ingress NP. When a flow control message has not been received, processing loops back until a flow control message has been received. When a flow control message has been received, processing continues with processing block 520.

In processing block 520 the flow control message is stored in the FCIFIFO. At this point, a parity bit is determined for the message and is stored with the message in the FIFO. The FIFO can store several messages, and the messages are read from the FIFO at the appropriate time.

Processing continues with decision block 530 where a determination is made regarding whether there was a parity error when the message was read from the FIFO. When a parity errors occurs on a read from the FCIFIFO processing continues with processing block 550. When a read from the FCIFIFO does not result in a parity error, processing continues with processing block 540.

As shown in processing block 550, as a result of the parity error on the read from the FCIFIFO, the error bit in the Ingress NP CSR is set. This provides notification to the core processor that an error has been detected. Additionally, processing block 560 is executed.

In processing block 560, as a result of the parity error, the corrupted data is pushed to the ME with an error signal asserted.

After executing processing block 560 when a parity error occurs, or as a result of the read from the FCIFIFO not resulting in a parity error, processing block 540 is executed. In processing block 540 the CFrame is sent to the ME. Processing then stops.

Having described particular embodiments, it will now become apparent to those of ordinary skill in the art that other embodiments incorporating these concepts may be used. Additionally, the software included may be embodied in a computer program product that includes a computer useable medium. For example, such a computer usable medium can include a readable memory device, such as a hard drive device, a CD-ROM, a DVD-ROM, or a computer diskette, having computer readable program code segments stored thereon. The computer readable medium can also include a communications link, either optical, wired, or wireless, having program code segments carried thereon as digital or analog signals. Accordingly, it is submitted that the present disclosure should not be limited to the described embodiments but rather should be limited only by the spirit and scope of the appended claims.

What is claimed is:

1. A device comprising:
    a network processor including a flow control message First In First Out (FIFO) buffer and wherein said FIFO buffer includes a parity field and wherein when said network processor detects a parity error on a read from said FIFO buffer, said network processor corrupts at least one of horizontal parity, vertical parity and Diagonal Interleaved Parity (DIP-2) code.

2. The device of claim 1 further comprising a Control and Status Register (CSR) and wherein an error bit is set in said CSR when a read from said FIFO buffer results in a parity error.

3. The device of claim 1 wherein when said network processor detects a parity error on a read from said FIFO buffer, said network processor asserts an error signal, pushes corrupted data to a device in communication with said network processor and flushes said FIFO buffer.

4. The device of claim 1 wherein said network processor comprises an Egress network processor and wherein said FIFO buffer comprises a Flow Control Egress First In First Out (FCEFIFO) buffer.

5. The device processor of claim 1 wherein said network processor comprises an Ingress network processor and wherein said FIFO buffer comprises a Flow Control Ingress First In First Out (FCIFIFO) buffer.

6. The device of claim 1 wherein said flow control message comprises a Common Switch Interface (CSIX) flow control message.

7. The device of claim 1 wherein said flow control message comprises a Network Processor Streaming Interface (NPSI) Network Processing Engine (NPE)-Fabric flow control message.

8. A method of handling parity errors in flow control channels comprising:
   receiving a flow control message at an Egress network processor;
   storing said flow control message and a parity bit in an FCEFIFO buffer;
   reading said flow control message from said FCEFIFO;
   determining whether there was a parity error during said read from said FCEFIFO, and when a parity error resulted from said read then setting an error bit in an Egress CSR and corrupting parity associated with said message; and
   sending said flow control message out of said Egress network processor.

9. The method of claim 8 wherein said corrupting parity associated with said error message comprises corrupting at least one of horizontal parity, vertical parity and DIP-2 code.

10. The method of claim 8 wherein said receiving a flow control message comprises receiving a CSIX flow control message.

11. The method of claim 8 wherein said receiving a flow control message comprises receiving a NPSI NPE-fabric flow control message.

12. The method of claim 10 wherein said sending said flow control message out of said Egress network processor comprises sending said flow control message to an Ingress network processor.

13. The method of claim 11 wherein said sending said flow control message out of said Egress network processor comprises sending said flow control message to a switch fabric.

14. A method of handling parity errors in flow control channels comprising:
   receiving a flow control message at an Ingress network processor;
   storing said flow control message and a parity bit in an FCIFIFO buffer;
   reading said flow control message from said FCIFIFO;
   determining whether there was a parity error during said read from said FCIFIFO, and when a parity error resulted from said read then setting an error bit in an Ingress CSR, pushing corrupted data out of said Ingress NP and flushing said FCIFIFO; and
   sending said flow control message out of said Ingress network processor when said read from said FCIFIFIO did not result in a parity error.

15. The method of claim 14 wherein said receiving a flow control message comprises receiving a CSIX flow control message.

16. The method of claim 14 wherein said receiving a flow control message comprises receiving a NPSI NPE-fabric flow control message.

17. The method of claim 14 wherein said sending said flow control message out of said Ingress network processor comprises sending said flow control message to a peripheral device.

18. An article comprising:
   a storage medium having stored thereon instructions that when executed by a machine result in the following:
   receiving a flow control message at an Egress network processor;
   storing said flow control message and a parity bit in an FCEFIFO buffer;
   reading said flow control message from said FCEFIFO;
   determining whether there was a parity error during said read from said FCEFIFO, and when a parity error resulted from said read then setting an error bit in an Egress CSR and corrupting parity associated with said message; and
   sending said flow control message out of said Egress network processor.

19. The article of claim 18 wherein said corrupting parity associated with said error message comprises corrupting at least one of horizontal parity, vertical parity and DIP-2 code.

20. The article of claim 18 wherein said receiving a flow control message comprises receiving a CSIX flow control message.

21. The article of claim 18 wherein said receiving a flow control message comprises receiving a NPSI NPE-fabric flow control message.

22. The article of claim 20 wherein said sending said flow control message out of said Egress network processor comprises sending said flow control message to an Ingress network processor.

23. The article of claim 21 wherein said sending said flow control message out of said Egress network processor comprises sending said flow control message to a switch fabric.

24. An article comprising:
   a storage medium having stored thereon instructions that when executed by a machine result in the following:
   receiving a flow control message at an Ingress network processor;
   storing said flow control message and a parity bit in an FCIFIFO buffer;
   reading said flow control message from said FCIFIFO;
   determining whether there was a parity error during said read from said FCIFIFO, and when a parity error resulted from said read then setting an error bit in an Ingress CSR, pushing corrupted data out of said Ingress NP and flushing said FCIFIFO; and
   sending said flow control message out of said Ingress network processor when said read from said FCIFIFIO did not result in a parity error.

25. The article of claim 24 wherein said receiving a flow control message comprises receiving a CSIX flow control message.

26. The article of claim 24 wherein said receiving a flow control message comprises receiving a NPSI NPE-fabric flow control message.

27. The article of claim 24 wherein said sending said flow control message out of said Ingress network processor comprises sending said flow control message to a peripheral device.

* * * * *

UNITED STATES PATENT AND TRADEMARK OFFICE
CERTIFICATE OF CORRECTION

PATENT NO. : 7,337,371 B2
APPLICATION NO. : 10/750999
DATED : February 26, 2008
INVENTOR(S) : Kuo et al.

It is certified that error appears in the above-identified patent and that said Letters Patent is hereby corrected as shown below:

In column 9, line 63, in Claim 14, delete "FCIFIFIO" and insert -- FCIFIFO --, therefor.

In column 10, line 54, in Claim 24, delete "FCIFIFIO" and insert -- FCIFIFO --, therefor.

Signed and Sealed this

Twenty-second Day of July, 2008

JON W. DUDAS
*Director of the United States Patent and Trademark Office*